US012759628B2

(12) United States Patent
Williams

(10) Patent No.: US 12,759,628 B2
(45) Date of Patent: Oct. 13, 2026

(54) APPARATUS AND METHOD FOR CONTROLLING A VEHICLE

(71) Applicant: ZF FRIEDRICHSHAFEN AG, Friedrichshafen (DE)

(72) Inventor: Daniel Williams, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 17 days.

(21) Appl. No.: 18/643,500

(22) Filed: Apr. 23, 2024

(65) Prior Publication Data

US 2024/0351634 A1 Oct. 24, 2024

Related U.S. Application Data

(60) Provisional application No. 63/497,835, filed on Apr. 24, 2023.

(51) Int. Cl.
*B62D 7/15* (2006.01)

(52) U.S. Cl.
CPC .................................... *B62D 7/159* (2013.01)

(58) Field of Classification Search
CPC ....................................................... B62D 7/159
See application file for complete search history.

(56) References Cited

U.S. PATENT DOCUMENTS

2007/0062741 A1* 3/2007 Hanamoto ............ F16H 61/456 180/338
2020/0039581 A1* 2/2020 Slave .................. B62D 7/1581
2020/0290588 A1* 9/2020 Källstrand ...... B60W 30/18145

FOREIGN PATENT DOCUMENTS

WO WO-2006005124 A1 * 1/2006 ............ B62D 13/00

OTHER PUBLICATIONS

Machine Translation of WO 2006005124 A1 PDF File Name: "WO2006005124A1_Machine_Translation.pdf" (Year: 2006).*

* cited by examiner

*Primary Examiner* — Grant Moubry
*Assistant Examiner* — Ruben Picon-Feliciano
(74) *Attorney, Agent, or Firm* — Tarolli, Sundheim, Covell & Tummino LLP

(57) ABSTRACT

An apparatus for controlling a vehicle has a first actuator for turning a first set of steerable vehicle wheels connected with a first axle of the vehicle. The first actuator turns the first set of steerable vehicle wheels connected with the first axle to cause the vehicle to turn and travel along a desired path. A second actuator turns a second set of steerable vehicle wheels connected with a second axle of the vehicle. A third actuator turns a third set of steerable vehicle wheels connected with a third axle of the vehicle. A control unit controls the second and third actuators connected with the second and third axles to turn the second set of steerable vehicle wheels and the third set of steerable vehicle wheels. The control unit may control the second and third actuators in response to a signal from a sensor to turn the second set and third set of steerable vehicle wheels connected with the second and third axles to eliminate, reject or reduce the yaw moment and lateral force acting on the vehicle due to an aerodynamic force.

3 Claims, 1 Drawing Sheet

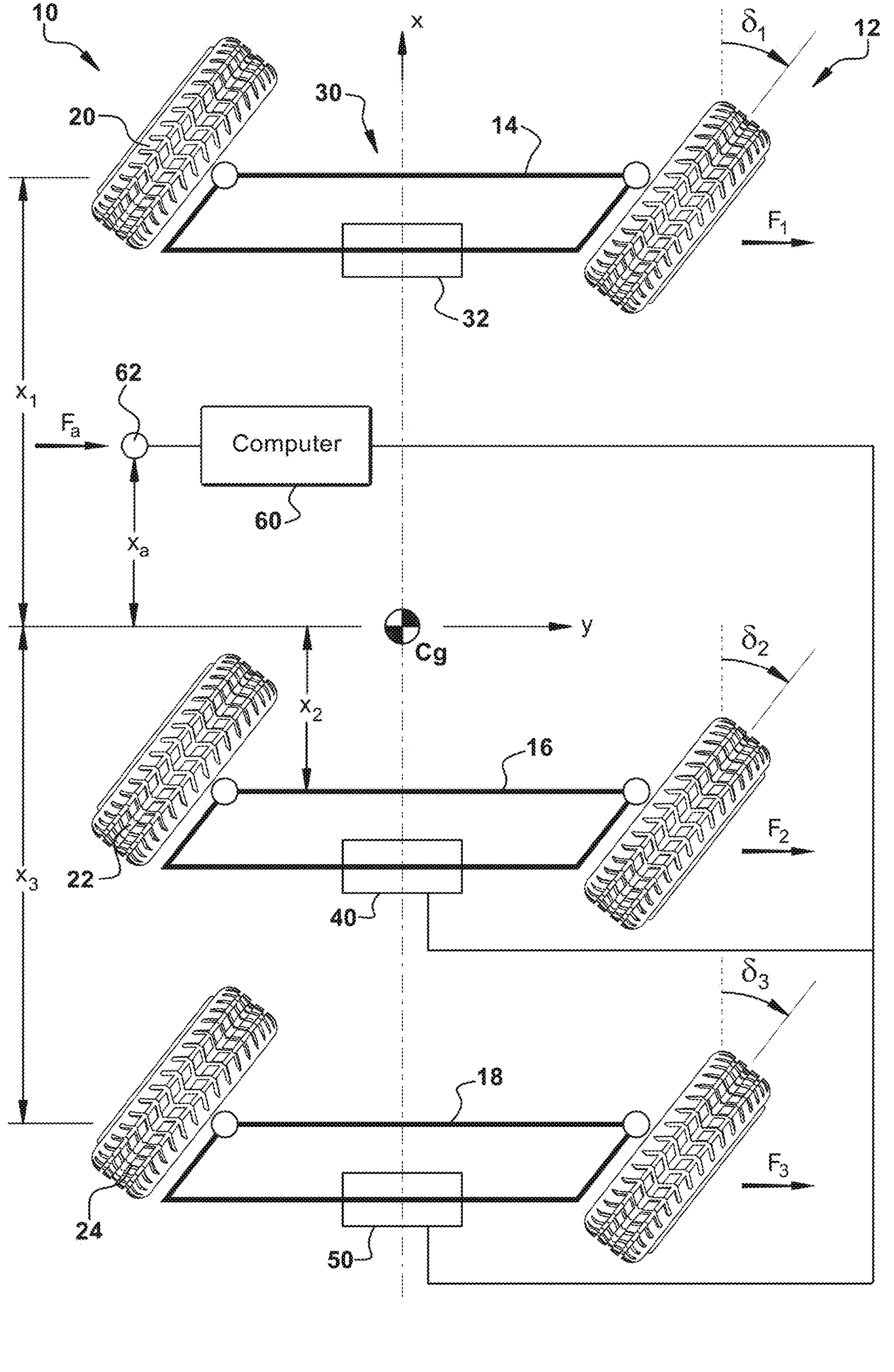
10
12
x
$\delta_1$
30
20
14
$F_1$
32
62
$x_1$
$F_a$
Computer
60
$x_a$
y
Cg
$\delta_2$
$x_2$
16
$F_2$
$x_3$
22
40
$\delta_3$
18
$F_3$
24
50

APPARATUS AND METHOD FOR CONTROLLING A VEHICLE

RELATED APPLICATIONS

This application claims priority to U.S. Provisional Application No. 63/497,835, filed on Apr. 24, 2023, which is incorporated herein by reference.

TECHNICAL FIELD

The present invention relates to an apparatus and method for controlling a vehicle and, more specifically, for controlling a vehicle with at least three axles to reduce or reject an aerodynamic disturbance acting on the vehicle.

BACKGROUND

It is known to steer the rear wheels of a two axle vehicle to eliminate lateral acceleration or yaw acceleration on the vehicle due to an aerodynamic disturbance, but not both. The elimination of the aerodynamic disturbance in either the lateral acceleration or yaw acceleration on the vehicle could make the disturbance worse in the other.

SUMMARY

The present invention relates to an apparatus for controlling a vehicle having a first actuator for turning a first set of steerable vehicle wheels connected with a first axle of the vehicle. The first actuator turns the first set of steerable vehicle wheels connected with the first axle to cause the vehicle to turn and travel along a desired path. A second actuator turns a second set of steerable vehicle wheels connected with a second axle of the vehicle. A third actuator turns a third set of steerable vehicle wheels connected with a third axle of the vehicle. A control unit controls the second and third actuators connected with the second and third axles to turn the second set of steerable vehicle wheels and the third set of steerable vehicle wheels.

In accordance with one of the features of the present invention, a sensor sends a signal indicative of a lateral aerodynamic force acting on the vehicle. The control unit controls the second and third actuators in response to the signal to turn the second set and third set of steerable vehicle wheels connected with the second and third axles and eliminate, reject or reduce the yaw moment and lateral force acting on the vehicle due to the aerodynamic force.

In accordance with another feature of the present invention, a method for controlling a vehicle having a first axle with a first set of steerable vehicle wheels, a second axle with a second set of steerable vehicle wheels and a third axle with third set of steerable vehicle wheels includes sensing a lateral aerodynamic force acting on the vehicle. The second set of steerable vehicle wheels on the second axle and the third set of steerable vehicle wheels on the third axle are turned in response to the lateral aerodynamic force acting on the vehicle to eliminate, reject or reduce the yaw moment and lateral force acting on the vehicle due to the aerodynamic force In accordance with another feature of the present invention, the second set of steerable vehicle wheels are turned to a calculated steering angle for the second set of steerable wheels and the third set of steerable vehicle wheels are turned to a calculated steering angle for the third set of steerable wheels.

DRAWINGS

FIG. 1 is a schematic illustration of an apparatus for use in reducing or rejecting aerodynamic disturbances in a vehicle having at least three axles.

DESCRIPTION

An apparatus 10 for use in rejecting or reducing an aerodynamic disturbance or force $F_a$ on a vehicle 12 constructed in accordance with the present invention is illustrated in FIG. 1. The apparatus 10 includes a first axle 14 having a first set of steerable vehicle wheels 20. A steering system 30 having a first actuator 32 may be connected with the first set of steerable wheels 20 on the first axle 14. The first set of steerable wheels 20 of the first axle 14 may be moved in any desired manner to cause the vehicle 12 to turn and travel along a desired path. The steerable wheels 20 of the first axle 14 may be moved autonomously and/or in response to an operator of the vehicle 12 turning a steering wheel of the vehicle.

A second axle 16 has a second set of steerable vehicle wheels 22. A second actuator 40 is connected with the second set of steerable vehicle wheels 22 of the second axle 16 to steer the steerable wheels 22 of the second axle. A third axle 18 has a third set of steerable vehicle wheels 24. A third actuator 50 is connected with the third set of steerable vehicle wheels 24 of the third axle 18 to steer the steerable wheels 24 of the third axle.

A control unit 60, such as a computer or electronic control unit (ECU), controls the second actuator 40 connected with the steerable wheels 22 of the second axle 16. The control unit 60 also controls the third actuator 50 connected with the steerable wheels 24 of the third axle. The control unit 60 may receive a signal from a pressure sensor 62 indicative of a lateral aerodynamic disturbance or lateral force $F_a$ acting on the vehicle 12. The pressure sensor 62 may be mounted a distance $x_a$ along the x-axis from the center of gravity Cg. The distance $x_a$ may be determined from wind tunnel data knowing the location of the sprung mass of the vehicle 12.

The control unit 60 may analyze the aerodynamic disturbance $F_a$ acting on the vehicle 12. The control unit 60 operates the second and third actuators 40, 50 connected with the second and third sets of wheels 22, 24 in response to the analysis of the aerodynamic disturbance $F_a$ to turn the steerable vehicle wheels 22, 24 connected with the second and third axles 16, 18 and eliminate, reject or reduce a yaw moment and lateral force acting on the vehicle 12 due to the aerodynamic disturbance $F_a$. The control unit 60 may receive signals from other vehicle condition sensors for controlling the actuators 40, 50 connected with the first and second axles 16, 18 based on sensed vehicle conditions.

The derivation of equations for determining steering angles to be applied to the steerable wheels 22, 24 on axles 16, 18 to reduce or reject the aerodynamic disturbance $F_a$ on the vehicle 12 is illustrated below.

A sum of the lateral forces acting on the vehicle 12 is shown in the following equation:

$$m(\dot{v}+ur)=F_1+F_2+F_3+F_a \tag{1}$$

where $F_1$ is the lateral force acting on wheels 20, $F_2$ is the lateral force acting on wheels 22, $F_3$ is the lateral force acting on wheels 24, $F_a$ is the lateral aerodynamic force acting on the vehicle 12 at the pressure sensor 62, m is the vehicle mass, $\dot{v}$ is vehicle lateral acceleration, u is vehicle speed and r is angular velocity or yaw rate of the vehicle.

A sum of lateral moments on the vehicle 12 is shown in the following equation:

$$I_x\dot{r} = x_1F_1 + x_2F_2 + x_3F_3 + x_aF_a \tag{2}$$

where $x_1$ is the distance along the x-axis from the center of gravity Cg of the vehicle 12 to axle 14, $x_2$ is the distance along the x-axis from the center of gravity Cg to axle 16, $x_3$ is the distance along the x-axis from the center of gravity Cg to axle 18, $x_a$ is the distance along the x-axis from the center of gravity Cg to the sensor 62, $I_x$ is the moment of inertia of the vehicle and $\dot{r}$ is the yaw acceleration of the vehicle.

The general side force model on a vehicle wheel is:

$$F_i = C_i\left(\delta_i - \frac{v + x_ir}{u}\right) \tag{3}$$

where $\delta_i$ is a steering angle of a steerable wheel and $C_i$ is a constant.

The result of inserting Equation 3 into Equation 1 and Equation 2 is the following:

$$m(\dot{v} + ur) = C_1\left(\delta_1 - \frac{v + x_1r}{u}\right) + C_2\left(\delta_2 - \frac{v + x_2r}{u}\right) + C_3\left(\delta_3 - \frac{v + x_3r}{u}\right) + F_a \tag{4}$$

$$I_x\dot{r} = x_1C_1\left(\delta_1 - \frac{v + x_1r}{u}\right) + x_2C_2\left(\delta_2 - \frac{v + x_2r}{u}\right) + x_3C_3\left(\delta_3 - \frac{v + x_3r}{u}\right) + x_aF_a \tag{5}$$

Equations 4 and 5 are solved for highest order derivatives and terms collected to yield the following:

$$\dot{v} = \left(\frac{-C_1 - C_2 - C_3}{mu}\right)v + \left(\frac{-x_1C_1 - x_2C_2 - x_3C_3}{mu} - u\right)r + \left(\frac{C_1}{m}\right)\delta_1 + \left(\frac{C_2}{m}\right)\delta_2 + \left(\frac{C_3}{m}\right)\delta_3 + F_a \tag{6}$$

$$\dot{r} = \left(\frac{-x_1C_1 - x_2C_2 - x_3C_3}{I_xu}\right)v + \left(\frac{-x_1^2C_1 - x_2^2C_2 - x_3^2C_3}{mu}\right)r + \left(\frac{x_1C_1}{m}\right)\delta_1 + \left(\frac{x_2C_2}{m}\right)\delta_2 + \left(\frac{x_3C_3}{m}\right)\delta_3 + x_aF_a \tag{7}$$

If the following relationships between $\delta_2$, $\delta_3$ and $F_a$ exist then the effect of $F_a$ on the yaw plane differential equations is eliminated:

$$F_a = -\left(\frac{C_2}{m}\right)\delta_2 - \left(\frac{C_3}{m}\right)\delta_3 \tag{8}$$

$$x_aF_a = -\left(\frac{x_2C_2}{m}\right)\delta_2 - \left(\frac{x_3C_3}{m}\right)\delta_3 \tag{9}$$

Equations 8 and 9 can be solved for steering angle input $\delta_2$ for the second set of wheels 22 on the second axle 16 and for steering angle input $\delta_3$ for the third set of wheels 24 on the third axle 18:

$$\delta_2 = \frac{1}{C_2}\left(\frac{x_a - x_3}{x_3 - x_2}\right)F_a \tag{10}$$

$$\delta_3 = \frac{1}{C_3}\left(\frac{x_2 - x_a}{x_3 - x_2}\right)F_a \tag{11}$$

The distances $x_1$, $x_2$, $x_3$, and $x_a$ are known and $C_2$ and $C_3$ are known constants. The sensor 62 sends a signal indicating the lateral aerodynamic force $F_a$ to the control unit 60. In response to the aerodynamic force $F_a$, the control unit 60 uses Equation 10 to calculate a steering angle $\delta_2$ for the wheels 22 on the second axle 16 and operates the second actuator 40 to turn the steerable wheels 22 to the calculated steering angle $\delta_2$. The control unit 60 also uses Equation 11 to calculate a steering angle $\delta_3$ for the wheels 24 on the third axle 18 and operates the third actuator 50 to turn the steerable wheels 24 to the calculated steering angle $\delta_3$. Thus, the control unit 60 operates the second and third actuators 40, 50 to turn the steerable vehicle wheels 22, 24 connected with the second and third axles 16, 18 and eliminate, reject or reduce a yaw moment and lateral force acting on the vehicle 12 due to the aerodynamic force $F_a$.

From the above description of the invention, those skilled in the art will perceive improvements, changes and modifications. These and other such improvements, changes, and/or modifications within the skill of the art are intended to be covered by the appended claims.

The invention claimed is:

1. An apparatus for controlling a vehicle comprising:

a first actuator for changing a steering angle of a first set of steerable vehicle wheels connected with a first axle of the vehicle, the first actuator changing the steering angle of the first set of steerable vehicle wheels connected with the first axle to cause the vehicle to turn and travel along a desired path;

a second actuator for changing a steering angle of a second set of steerable vehicle wheels connected with a second axle of the vehicle;

a third actuator for changing a steering angle of a third set of steerable vehicle wheels connected with a third axle of the vehicle;

a sensor that sends a signal indicative of a lateral aerodynamic force acting on the vehicle; and a control unit that controls the second and third actuators connected with the second and third axles to change the steering angles of the second set of steerable vehicle wheels and the third set of steerable vehicle wheels, the control unit controlling the second and third actuators in response to the signal to change the steering angles of the second set and third set of steerable vehicle wheels connected with the second and third axles and eliminate, reject or reduce the yaw moment and lateral force acting on the vehicle due to the aerodynamic force, the control unit changing the steering angle of the second set of steerable vehicle wheels to a steering angle calculated as $$\delta_2 = \frac{1}{C_2}\left(\frac{x_a - x_3}{x_3 - x_2}\right)F_a$$

and the control unit changing the steering angle of the third set of steerable vehicle wheels to a steering angle calculated as $$\delta_3 = \frac{1}{C_3}\left(\frac{x_2 - x_a}{x_3 - x_2}\right)F_a$$

where $x_2$ is the distance along an x-axis of the vehicle from a center of gravity of the vehicle to the second axle, $x_3$ is the distance along the x-axis from the center of gravity to the third axle, $x_a$ is the distance along the x-axis from the center of gravity to the sensor and $F_a$ is the lateral aerodynamic force acting on the vehicle.

2. A method for controlling a vehicle having a first axle with a first set of steerable vehicle wheels, a second axle with a second set of steerable vehicle wheels and a third axle with a third set of steerable vehicle wheels comprising:

sensing a lateral aerodynamic force acting on the vehicle;

changing a steering angle of the second set of steerable vehicle wheels on the second axle and changing a steering angle of the third set of steerable vehicle wheels on the third axle in response to the lateral aerodynamic force acting on the vehicle to eliminate, reject or reduce the yaw moment and lateral force acting on the vehicle due to the aerodynamic force; and calculating a steering angle for the second set of steerable wheels as $$\delta_2 = \frac{1}{C_2}\left(\frac{x_a - x_3}{x_3 - x_2}\right)F_a$$

calculating a steering angle for the third set of steerable wheels as $$\delta_3 = \frac{1}{C_3}\left(\frac{x_2 - x_a}{x_3 - x_2}\right)F_a$$

where $x_2$ is the distance along an x-axis of the vehicle from a center of gravity of the vehicle to the second axle, $x_3$ is the distance along the x-axis from the center of gravity to the third axle, $x_a$ is the distance along the x-axis from the center of gravity to a sensor that senses the lateral aerodynamic force and $F_a$ is the lateral aerodynamic force acting on the vehicle; and changing the steering angle of the second set of steerable vehicle wheels to the calculated steering angle for the second set of steerable vehicle wheels and changing the steering angle of the third set of steerable vehicle wheels to the calculated steering angle for the third set of steerable wheels.

3. The method as set forth in claim 2, further including changing a steering angle of the first set of steerable vehicle wheels with a first actuator, the step of changing the steering angle of the second set of steerable vehicle wheels includes actuating a second actuator to change the steering angle of the second set of steerable vehicle wheels, the step of changing the steering angle of the third set of steerable vehicle wheels includes actuating a third actuator to change the steering angle of the third set of steerable vehicle wheels.

* * * * *